United States Patent

Sanford

Patent Number: 5,863,611
Date of Patent: Jan. 26, 1999

[54] IMINODIACETONITRILE MIRROR BACK COATING CORROSION INHIBITOR

[75] Inventor: Timothy J. Sanford, Randolph, N.Y.

[73] Assignee: Lilly Industries (USA), Inc., Indianapolis, Ind.

[21] Appl. No.: 863,219

[22] Filed: May 27, 1997

[51] Int. Cl.$^6$ .............................. B05D 5/00; B05D 3/00; B32B 15/08; C23F 11/00

[52] U.S. Cl. .................. 427/385.5; 427/386; 427/388.1; 427/388.2; 427/388.3; 106/14.34; 106/14.37; 106/14.41; 106/14.42; 252/389.1; 252/394; 428/418; 428/425.8; 428/458; 428/460; 428/461; 428/467; 428/470; 524/206; 524/209

[58] Field of Search .............................. 106/14.34, 14.37, 106/14.41, 14.42; 427/385.5, 386, 388.1, 388.2, 388.3; 428/418, 425.8, 458, 460, 461, 467, 470; 252/389.1, 394; 524/206, 209

[56] References Cited

U.S. PATENT DOCUMENTS

| | | | |
|---|---|---|---|
| 2,790,778 | 4/1957 | Spivack et al. | 252/392 |
| 2,867,538 | 1/1959 | Bienenfeld | 106/14.13 |
| 3,262,791 | 7/1966 | Dickson et al. | 106/14.16 |
| 3,668,137 | 6/1972 | Gardner | 507/242 |
| 3,776,950 | 12/1973 | Mitsch et al. | 564/12 |
| 3,854,959 | 12/1974 | Costain et al. | 106/14.15 |
| 4,196,233 | 4/1980 | Bitzer et al. | 427/249 |
| 4,255,214 | 3/1981 | Workens | 148/269 |
| 4,543,215 | 9/1985 | Brunnmueller | 558/390 |
| 4,556,110 | 12/1985 | Wu | 166/310 |
| 4,707,405 | 11/1987 | Evans et al. | 428/336 |
| 5,226,956 | 7/1993 | Askew et al. | 106/14.05 |
| 5,248,331 | 9/1993 | Sanford et al. | 106/14.42 |
| 5,252,402 | 10/1993 | Sanford | 428/425.8 |
| 5,314,532 | 5/1994 | Hughes et al. | 106/253 |
| 5,389,301 | 2/1995 | Fenzi | 252/394 |

FOREIGN PATENT DOCUMENTS

| | | |
|---|---|---|
| 5-311485 | 11/1993 | Japan . |
| 5-311492 | 11/1993 | Japan . |
| 5-311495 | 11/1993 | Japan . |

Primary Examiner—Anthony Green
Attorney, Agent, or Firm—DeLio & Peterson, LLC

[57] ABSTRACT

A lead-free composition capable of being applied as a film and hardening to form a protective layer on the back of a mirror comprises a fluid organic resin and a corrosion inhibitor selected from a compound represented by the formula:

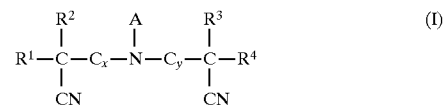

wherein the individual radicals $R^1$, $R^2$, $R^3$ and $R^4$ can be identical or different and are each hydrogen, an aliphatic, cycloaliphatic, araliphatic or aromatic radical, and can be substituted or unsubstituted; A is hydrogen or $C_z$—$CR^5R^6CN$; X, Y and Z are independently selected from 0–5; and $R^5$ and $R^6$ are as defined for $R^1$, $R^2$, $R^3$ and $R^4$ above. To inhibit the corrosion of metallic film layers on mirrors, a mirror having a glass substrate layer and metallic film layer thereover should be obtained, after which the fluid organic resin coating system containing the aforementioned corrosion inhibitor is applied over the metallic film layer. The organic resin coating system is then hardened to produce the protective coating layer over the metallic layer. Other articles having metallic surfaces may also be protected by the resin system containing the novel corrosion inhibitor of the present invention.

51 Claims, No Drawings

IMINODIACETONITRILE MIRROR BACK COATING CORROSION INHIBITOR

BACKGROUND OF THE INVENTION

1. Field of the Invention

This invention relates to a coating for use on mirror backs, and, in particular, to a lead-free organic coating containing a di- or tri- nitrile containing compound, preferably iminodiacetonitrile or nitrilotriacetonitrile, which coating is applied to the metallic film layer on the back of a mirror to protect the metallic layer and prevent corrosion thereof.

2. Description of Related Art

Typical mirrors are made of a glass sheet and a thin layer of a metallic film applied to the back of the sheet. The metallic film layer adhered directly to the glass is usually a film of silver, although other metallic films may also be used, such as copper. When silver is used as the primary reflective layer, it is commonly protected by a second metallic film layer of copper or some other metal.

It has long been known to employ various paints and other film-forming organic resins as a further protective layer over a metallic film layer to protect the layer from corrosion and physical damage. Traditionally, these paints have included lead-based corrosion inhibitors, such as lead salts. However, in recent times, both users and producers of such paint products have sought to eliminate the use of lead and lead compounds for health and environmental reasons.

Numerous efforts have been made to eliminate lead from paints and/or otherwise increase the effectiveness and usefulness of protective coatings for mirror back metallic films. A recent effort in this direction is reflected in U.S. Pat. No. 4,707,405 to Evans et al. directed to use of cyanamide salts of non-lead metals as corrosion inhibitive pigments in mirror back coatings. This patent discloses the use of such non-lead cyanamide salts as calcium cyanamide and zinc cyanamide in various types of film-forming thermosetting or thermoplastic resins which are applied over the silver and copper layers on the backs of mirrors. U.S. Pat. Nos. 5,248,331 and 5,252,402 to Sanford et al. disclose a lead-free paint or resin composition for use as a mirror back coating containing as a corrosion inhibitor dicyandiamide, metal or acid salts thereof, hydrogen cyanamide and 2-cyanoacetamide. U.S. Pat. No. 5,314,532 to Hughes et al. discloses the use of soluble salt-free contaminant-free antioxidant pigments which are cyanamide derivatives of metals and which are used in combination with organic resin polymers as protective mirror backing coatings. The patent discusses the prior art U.S. Pat. No. 4,707,405 to Evans et al., supra, which uses the same cyanamide salts of non-lead metals as a corrosion inhibitor in organic film forming resins for mirror back coatings with the improvement being the use of "pure" salts. Accordingly, the pure salts contain less than about 0.5 percent by weight of soluble salts. U.S. Pat. No. 4,255,214 to Workens discloses a method for protecting silver and copper coated mirrors against oxidation and corrosion by passivating the metallic coating prior to applying a protective organic coating. The silver and copper coating is passivated by applying an effective amount of tolyltriazole to the metal surfaces before applying the protective organic coating. U.S. Pat. No. 5,389,301 to Fenzi discloses a lead-free anticorrosive resin formulation containing cyanoacetylurea for protecting mirror backs. Japanese patents 5311485, 5311492 and 5311495 show processes for treating a noble metal, including silver, by electrolyzing the metal in an aqueous solution containing an organic compound such as an imino compound or other nitrogen containing compounds such as EDTA to increase the corrosion resistance of the noble metal.

U.S. Pat. No. 4,543,215 to Brunnmueller et al. discloses novel iminodiacetonitriles and their preparation. It is disclosed that the nitrites are useful as starting materials for the preparation of dyes, fungicides and other materials including anticorrosion agents.

The disclosures of the above patents are hereby incorporated by reference.

Bearing in mind the problems and deficiencies of the prior art, and the long felt need of industry, it is therefore an object of the present invention to provide an effective corrosion inhibiting, lead-free coating for covering the metallic film layers on the back of a mirror and other articles of manufacture.

It is another object of the present invention to provide an organic film-forming resin which incorporates a non-lead corrosion inhibitor which can be easily applied by existing techniques to mirror backs.

It is a further object of the present invention to provide a lead-free paint for protecting thin silver and/or copper or other metallic film layers against corrosion.

It is yet another object of the present invention to provide an effective process for inhibiting corrosion of metallic film layers on mirrors and other articles of manufacture.

It is a further object of the present invention to provide mirror and other articles having effective protection of their metallic film layers against salt spray and other corrosion-causing compounds.

Other objects and advantages of the present invention will be readily apparent from the following description.

SUMMARY OF THE INVENTION

The above and other objects, which will be apparent to those skilled in the art, are achieved in the present invention which provides in a first aspect a composition comprising a paint or other fluid organic resin coating system capable of being applied as a film and hardened to form a protective layer, the resin additionally containing a corrosion inhibitor containing a di- and/or tri- nitrile containing compound. Preferred compounds may be defined according to the formula:

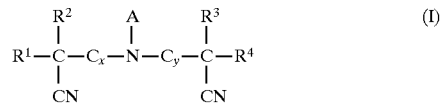

wherein the individual radicals $R^1$, $R^2$, $R^3$ and $R^4$ can be identical or different and are each hydrogen, an aliphatic, cycloaliphatic, araliphatic or aromatic radical, and can be substituted or unsubstituted; A is hydrogen or $C_z$—$CR^5R^6CN$; X, Y and Z are independently selected from 0–5; and $R^5$ and $R^6$ are as defined for $R^1$, $R^2$, $R^3$ and $R^4$ above. A preferred additive is iminodiacetonitrile (IDAN) where A is hydrogen; $R^1$, $R^2$, $R^3$ and $R^4$ are each hydrogen; and X and Y are 0.

The term "hardened" is used to mean that the coating system can be cured if the resins are thermosetting or dried if the resins are thermoplastic. The organic resins employed in the coating system can be any thermoplastic or thermosetting resin suitable for coating a metallic layer such as that found on the back of a mirror. Exemplary resins include alkyd resins, acrylic resins, acrylic and other modified alkyd resins, polyesters, urethane oils, vinyl halide polymers or copolymers, oleoresinous varnishes, nitrocellulose compositions, phenol-formaldehyde resins varnishes and epoxy resins. Preferably, the resin is an alkyd or modified, e.g., short oil, alkyd resin or a phenolic alkyd resin system.

The corrosion inhibitor compounds may be present in an amount, by weight, about 0.1 to 20%, preferably about 0.5 to 10%, based on the organic resin coating system (including resins, solvents and other additives). Preferably, the organic resin coating system should be essentially free of lead and lead salts, either as corrosion inhibitors or other components.

To inhibit the corrosion of metallic film layers on mirrors, a mirror having a glass substrate layer and a metallic film layer thereover should be obtained, after which the fluid organic resin coating system containing one or more of the aforementioned corrosion inhibitors is applied over the metallic film layer. The organic resin coating system is then hardened to produce a protective coating layer over the metallic layer.

The preferred mirror article contains, in sequence, the glass substrate, the metallic film layer(s) which may be silver and/or copper or some other metal, and the hardened organic resin system as described above. Preferably, the mirror has a thin layer of silver film attached directly to the glass layer as the reflective layer, a thin protective layer of a copper film over the silver layer, and the hardened coating system described above directly over the copper film layer as the primary corrosion inhibitor layer. Other articles having metallic surfaces may be protected by the non-lead corrosion inhibitor-containing resin systems described above as well.

DESCRIPTION OF THE PREFERRED EMBODIMENT(S)

The mirrors and metallic film layers on which the coating of the present invention has been found to be particularly useful are those in which one or more layers of silver and/or copper films have been applied to a glass substrate, although the coating may also be useful over film layers of other metals as well. Preferably, the mirror consists of a substrate layer of glass and a layer of reflective silver or copper film applied to the rear surface of the glass. If a silver film is applied directly to the glass, it is common to apply a second film layer of copper over the silver to provide protection against corrosion and physical damage to the silver layer. Such metallic film layers are relatively thin and on the order of approximately 700 angstroms for the silver layer and approximately 210 angstroms for the copper layer.

Such mirrors may be made by any of the known processes in the prior art. The glass surface to which the metallic film layer is to be applied is usually lightly polished and cleaned and thereafter sensitized with an aqueous stannous chloride solution. The silver film layer may be deposited on the sensitized glass surface by one of many methods such as that described in U.S. Pat. No. 4,737,188 to Bahls, the disclosure of which is hereby incorporated by reference, in which an N-methylglucamine reducer is utilized with ammoniacal silver nitrate and a strong base such as sodium hydroxide in an aqueous solution which solution is sprayed on and combined at the sensitized glass surface to deposit the silver film. Thereafter, a copper film may be applied to and over the silver film by any one of a variety of prior art procedures such as a galvanic process which utilizes aqueous suspensions of iron and copper powder or by the disproportionation of cuprous ions on the silver surface. The latter process is described in U.S. Pat. No. 3,963,842 to Sivertz et al., the disclosure of which is hereby incorporated by reference. In such a process, a cupric tetraammonium sulfate solution is reduced by combination with hydroxylamine sulfate and thereafter reacted with an activator-modifier such as a mixture of citric acid or ethylene diamine and $H_2SO_4$ to form a copper film on the silvered surface. An ammonia-free process for the deposition of copper by disproportionation is shown in U.S. Pat. No. 5,419,926 to Soltys. The above patents are hereby incorporated by reference.

The coating of the present invention to be applied over the copper, silver or other metallic film layers is based on any suitable thermosetting or thermoplastic organic film-forming resins. The thermosetting resins contemplated in use in the present invention are those that require heat to effect curing, such as by infrared heating, although room temperature air drying resins are also included.

Suitable resins include alkyd resins, acrylic resins, polyesters, urethane oils, vinyl halide polymers or copolymers, oleoresinous varnishes, nitrocellulose compositions, phenol-formaldehyde resin varnishes, epoxy resins, or combinations of such resins. Preferably, the resins employed in the present invention are alkyd or modified alkyd resins such as acrylic-alkyd copolymers in combination with a solvent, and other additives such as a pigment, if desired, to produce a resin coating system. Such alkyd resin systems may be modified with acrylics, urethanes and polyurethanes, phenolics, and combinations of the above. More preferably, the resins may be acrylic-alkyd copolymers and phenolic resins in combination. Amino crosslinking agents such as melamine-formaldehyde resins and/or urea-formaldehyde resins may be included in the modified alkyd or other resin system to make the system heat-curable. Alternatively metal dryers can be employed in the system to make it air drying.

The resin system of the present invention should employ a binder resin which casts a suitable film and provides good adhesion to and over the aforementioned metallic film layer(s). The system may employ a suitable solvent of the type normally employed in the particular resin system. For example, in the preferred alkyd and modified alkyd resin systems of the present invention, an ester such as propylene glycol monomethyl ether acetate, butyl acetate or isobutyl acetate may be employed. Preferably, the alkyd or modified alkyd resins comprise 20 to 50 percent by weight of the system, more preferably 20 to 35 weight percent. The solvents or solvent blends employed in this system are preferably 20 to 35 percent by weight of the system. Additives normally employed in resin coating systems for this type of application may also be added in addition to the resins and solvent, for example, pigments (where it is desired to impart a color) and inert fillers or extenders such as barytes or calcium carbonate; flow additives; anti-settling agents to support any dense pigment particles; catalysts such as blocked or unblocked acids (where a thermosetting resin is employed); surface active agents; antiskinning agents such as methyl ethyl ketoxime; and additives for other purposes.

The aforementioned resin systems are by themselves fully hardenable to form a film over a metallic film layer. To impart effective corrosion resistance for the metallic film layer, the present invention specifically contemplates the use of a non-lead compound represented by the following formula:

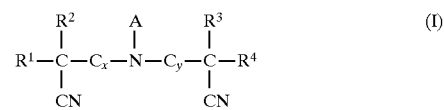

wherein the individual radicals $R^1$, $R^2$, $R^3$ and $R^4$ can be identical or different and are each hydrogen, an aliphatic, cycloaliphatic, araliphatic or aromatic radical, and can be substituted or unsubstituted; A is hydrogen or $C_z$—$CR^5R^6CN$; X, Y and Z are independently selected from 0–5; and $R^5$ and $R^6$ are as defined for $R^1$, $R^2$, $R^3$ and $R^4$ above. A preferred additive is iminodiacetonitrile wherein A is hydrogen; $R^1$, $R^2$, $R^3$ and $R^4$ are each hydrogen; and X and Y are 0.

Another preferred additive is nitrilotriacetonitrile (NTAN) wherein A is $C_z$—$CR^5R^6CN$; X, Y and Z are 0; and $R^1$–$R^6$ are all hydrogen.

The nitrile corrosion inhibitors of the invention are well-known compounds and their method of preparation are likewise well-known to those skilled in the art. U.S. Pat. No. 4,543,215, supra, discloses, -iminodiacetonitriles and their method of preparation. Methods of preparation include reacting an aldehyde-cyanohydrin with an aminonitrile. Other prior art preparation methods disclosed therein include reacting, -aminonitriles with a carbonyl compound in a first stage and treating the resulting mixture with hydrocyanic acid. The corrosion inhibitor additives may be employed in an amount, by weight, of about 0.01 to about 25% of the resin coating system, although about 0.1 to about 10% is preferred. More preferably, a range of about 0.1% to about 5% is employed, e.g., 0.5% to 1.5%. At the higher amounts, particularly above 10%, the corrosion inhibitor becomes particularly susceptible to reaction with water, for example, any moisture present in the environment. If such higher amounts of the nitrile compound are employed in the resin coating system of the present invention, it is preferred that an additional water or moisture proof coating be applied over the hardened resin coating.

The corrosion inhibitors of the present invention may be blended with the resin system by comminuting them into fine particles, generally up to about 50 microns, preferably from 10 to 40 microns and most preferably about 1 to 10 micron, e.g., 5 microns in size. It has been found that when the small size particles are employed, a lower overall weight percentage of the inhibitor is needed to achieve a desired level of corrosion protection, since the smaller particle size can be dispersed throughout the resin to a greater extent to provide the necessary protection. Alternatively, the corrosion inhibitor may be dissolved in a suitable solvent and dispersed and blended into the resin system. The corrosion inhibitors are believed to be substantially unreacted in the blended, fluid resin system and available for corrosion inhibition during or after application to the metallic surface.

While not wishing to be limited by theory, it is thought that the non-lead corrosion inhibitor compounds disclosed herein react in the present system to: 1) passivate the metallic film on which it is applied, for example, a copper film, and create a complex with the metal to reduce corrosion; 2) increase the adhesion of the metal film, such as copper, to the cured resin; or 3) a combination of 1 and 2 above. The corrosion inhibitors are incorporated instead of utilizing conventional lead based pigments, such as lead salts, employed in the past. However, other corrosion inhibitors may be used in conjunction with the nitrile compounds such as zinc oxide, to provide a desired degree of protection in a specific application. If desired, low amounts of leaded materials which comply with environmental laws and regulations may be added to the resin system. Preferably, the blended resin system to be applied over the aforementioned metallic films is completely free of lead to comply more easily with environmental laws and regulations in its manufacturing and use.

The blended resin system employing the non-lead corrosion inhibitors of the present invention is applied to the metallic layers on the mirror backs by conventional processes, such as air or airless spraying (preferably the latter), roller coating, curtain coating, screen printing or electrostatically. Thermosetting resin systems such as the aforementioned preferred alkyd or modified alkyd resin systems may be dried by infrared heating, typical conditions being five minutes heating time with an exit film temperature of about 250° F. (120° C.). The thickness of the dried resin film layer may be up to 0.002 in. (51 microns) thick, or higher although it is preferred that the film thickness be from about 0.001 to 0.0015 in. (25 to 38 microns) in thickness. Where thicker coatings are desired, multiple layers of the coating may be applied. The use of the thin layers described above enables the applied resin system to be quickly dried to a hardened layer without causing bubbles or other defects. The resin system incorporating the corrosion inhibitors of the present invention provide good protection to the edges of the mirror metallic film layers, at which location corrosion usually commences. Mirror edge corrosion (also known as "black edge") can occur because of moisture present in bathrooms or other high humidity environments. Other causes include the use of certain adhesives in which a component (for example, acetic acid in silicone based adhesives) can attack the resin coating layer and metallic film. Also, where the edges of the mirrors are beveled or polished with an abrasive, abrasive coolant having a high pH level can remain on the edge and attack the paint and metallic film layers of the mirror.

In addition to providing good corrosion protection, the resin coating system employing the corrosion inhibitors of the present invention should be able to provide a smooth finish having a good appearance, and, if the mirror is later cut or otherwise handled, should prevent chipping of the resin paint at the mirror edges.

The following non-limiting examples are provided to illustrate resin systems employing corrosion inhibitors of the present invention.

A series of glass panels were cleaned, sensitized, and coated with successive layers of a silver film and a copper film according to the processes described above. The resulting silver film layer was approximately 700 angstroms thick and the resulting copper film top layer was approximately 220 angstroms thick.

The silver was applied to the glass panels by a conventional spray system and the copper was applied to the silver layer on a comparative basis by either a galvanic system or cuprous disproportionation system.

EXAMPLE 1

To test the effect of the claimed nitrile compounds as corrosion inhibitors a commercial short oil alkyd based liquid resin coating system used as a base for preventing corrosion of the metal layer of mirrors was modified as shown below in Table 1 by adding to the system the noted additives at a concentration of 15–20 lb/100 gal (about 1.4–1.9% wt/wt). The density of the resin is about 11 lb/gal. The liquid resin coating systems were applied to the copper layer on the backs of the aforementioned mirrored glass samples using a draw down bar and thereafter subjected to infrared drying at about 250° F. (120° C.) for approximately five (5) minutes until cured to a hardened film layer of approximately 0.001 in. (25 microns) thickness.

The coated mirror samples were then subjected to a corrosion test in a 20% salt spray environment for 300 hours pursuant to Federal specification DD-M-4411B and ASTM B-117-73. All the additives were added to the resin coating system as commercially available powders.

TABLE 1

| Additive No. | Additive | Edge Failure (mm) | Density of Spots |
|---|---|---|---|
| 1 | 4,5 DICYANOIMIDAZOLE | Trace–2 | 34 |
| 2 | IMINODIACETONITRILE | 1–2 | 16 |
| 3 | AMINO-IMIDAZOLE DICARBONITRILE | 3–18 | 12 |
| A | CYANO ACETYL URETHANE | 1–7 | TNTC* |
| B | 2-CYANOACETAMIDE | 1–2 | TNTC |
| C | DICYANDIAMIDE (DCDA) | Trace–2 | 10 |
| D | CYANO ACETYL UREA | 2–12 | TNTC |
| E | CONTROL (NO CORROSION ADDITIVE) | 20–32 | Total Failure |

*TNTC = To Numerous To Count

The results show that additive numbers 1, 2 and 3 of the invention provided excellent corrosion inhibiting results.

EXAMPLE 2

The resin coating system of EXAMPLE 1 was used to show the effect of concentration on the effectiveness of the additive of the invention. IDAN was pulverized to approximately 5 micron particle size and added to the system in the concentration as shown in Table 2. A control using DCDA at 15 lb/gal. showed 0 black edge (mm) and had density of spots of 8.

TABLE 2

| Additive Concentration lb./gal. | Edge Failure (mm) | Density of Spots |
|---|---|---|
| 5 | 2–19 | 57 |
| 5 | 3–16 | 59 |
| 10 | 1–3 | 18 |
| 10 | 1–3 | 16 |
| 13 | Trace–1 | 48 |
| 15 | Trace–1 | TNTC |

EXAMPLE 3

The following example shows the effect of particle size on the corrosion inhibiting effectiveness of IDAN. The resin coating system of EXAMPLE 1 was used and the IDAN added to each sample at a level of 10 lbs./100 gallon. The results are shown in Table 3.

TABLE 3

| Additive Particle Size | Edge Failure (mm) | Density of Spots |
|---|---|---|
| Lab Grind | Trace–8 | 80 |
| Pebble Mill Grind | Trace–11 | 26 |
| Pulverized | Trace–1 | 15 |

The lab grind is about 40 micron, the pebble mill grind about 25 micron and the pulverized about 5 micron.

EXAMPLE 4

The following example shows the effect of both additive level and the type copper surface being protected when using IDAN in the resin formulation of Example 1. The IDAN had a particle size of about 5 micron. The results are shown in Table 4.

TABLE 4

| Additive Level | Edge Failure (mm) | |
|---|---|---|
| lb/100 gal. | Galvanic Copper | Dispro Copper |
| 0 | 3–25 | Total Failure |
| 0.01 | 3–30 | Total Failure |
| 0.10 | 2–25 | Total Failure |
| 1.0 | 1–25 | 8–39 |
| 2.0 | 7–45 | Trace–3 |
| 5.0 | Trace–25 | Trace–1 |
| 10.0 | Trace–10 | 1–15 |
| 15.0 | 1–14 | 1–15 |
| Lead Control* | Trace–5 | 10–37 |

*Lead in the form of lead cyanamide was used at a level of 40 lb/100 gal.

EXAMPLE 5

The following example shows the effectiveness of different levels of IDAN in another commercial resin formulation which is a phenolic-alkyd resin based resin coating system used for preventing corrosion of mirrors. The results are shown in Table 5.

TABLE 5

| Additive Level (lb./100 gal.) | Edge Failure (mm) | Density of Spots |
|---|---|---|
| 5 | 1–15 | 39 |
| 6 | Trace–5 | 46 |
| 7 | Trace–2½ | 51 |
| 8 | 1–5 | 52 |
| 9 | Trace–1½ | 52 |
| 10 | Trace–2 | 42 |
| Lead Control* | 0–4 | 18 |

*Lead in the form of lead cyanamide was used at a level of 40 lb/100 gal.

EXAMPLE 6

Various metal corrosion resin systems were tested as in Example 1 to show the effectiveness of IDAN in different resins systems. The results are shown in Table 6.

TABLE 6

| Resin System | Edge Failure (mm) | Density of Spots |
|---|---|---|
| Medium Linseed/Phenolic Alkyd | Tr–1 | 29 |
| Dehydrated Castor Oil/Phenolic Alkyd | Tr–1 | 6 |
| Acrylic-Alkyd | 0–5 | 61 |
| Short Oil Alkyd | Tr–2 | 17 |
| Short Linseed/Phenolic | Tr–1 | TNTC |
| Dehydrated Castor Oil/Alkyd | Tr–13 | 10 |

EXAMPLE 7

The following example shows the effectiveness of IDAN when tested according to Example 1.

TABLE 7

| Additive Level (lb/100 gal) | Edge Failure (mm) | Density of Spots |
|---|---|---|
| 14 | 1–2 | 16 |
| 0 | 20–32 | Total Failure |
| Control (DCDA) | Tr–2 | 10 |

The aforementioned examples of resin systems including the corrosion inhibitors of the present invention may be further modified, for example, by including other pigments such as zinc oxide or titanium dioxide in part replacement for the talc, or by using additional resin in part replacement for the pigments to achieve better corrosion resistance. In addition to protection of film layers of mirrors, as described above, the resins containing the corrosion inhibitors of the present invention may be applied to and over metallic surface layers, such as copper, copper-based alloys, silver, or silver based alloys of other articles to provide enhanced corrosion protection.

While the invention has been described with reference to specific embodiments, it will be recognized by those skilled in the art that variations are possible without departing from the spirit and scope of the invention, and that it is intended to cover all changes and modifications of the invention disclosed herein for the purposes of illustration which do to constitute departure from the spirit and scope of the invention.

Having thus described the invention, what is claimed is:

1. A composition for inhibiting corrosion of a metallic film layer on mirror backs comprising a fluid organic resin coating system capable of being applied as a film and hardening to form a protective layer over said metallic film layer, said resins system comprising an organic resin, and a corrosion inhibitor in an amount, by weight, of about 0.01 to 20% represented by the formula:

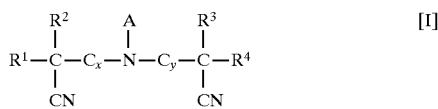

wherein the individual radicals $R^1$, $R^2$, $R^3$ and $R^4$ can be identical or different and are each hydrogen, an aliphatic, cycloaliphatic, araliphatic or aromatic radical, and can be substituted or unsubstituted; A is hydrogen or $C_z$—$CR^5R^6CN$; X, Y and Z are independently selected from 0–5; and $R^5$ and $R^6$ are as defined for $R^1$, $R^2$, $R^3$ and $R^4$ above.

2. The composition of claim 1 wherein said corrosion inhibitor is present in an amount, by weight, of about 0.1 to 10% of said organic resin coating system.

3. The composition of claim 1 wherein said coating system is lead-free.

4. The composition of claim 1 wherein said corrosion inhibitor is present in an amount, by weight, of about 0.5 to 1.5% weight percent of said organic resin coating system.

5. The composition of claim 1 where said corrosion inhibitor is present in an amount, by weight, of about 0.1 to 10% of said organic resin coating system and the particle size of the corrosion inhibitor is up to about 50 microns.

6. The composition of claim 1 wherein said corrosion inhibitor is iminodiacetonitrile.

7. The composition of claim 6 wherein said composition is essentially lead free.

8. The composition of claim 1 wherein said corrosion inhibitor is nitrilotriacetonitrile.

9. The composition of claim 8 wherein said composition is essentially lead-free.

10. The composition of claim 1 wherein said organic resin coating system is selected from the group consisting of alkyd resins, modified alkyd resins, acrylic resins, melamine formaldehyde resins, urea formaldehyde resins, and combinations thereof.

11. The composition of claim 10 wherein said corrosion inhibitor is iminodiacetonitrile.

12. The composition of claim 11 wherein said composition is essentially lead free.

13. The composition of claim 10 wherein said corrosion inhibitor is nitrilotriacetonitrile.

14. The composition of claim 13 wherein said composition is essentially lead free.

15. A composition for inhibiting corrosion of a metallic surface comprising a liquid organic resin coating system capable of being applied as a film and hardening to form a protective layer over said metallic surface, said resin system including an organic resin and a corrosion inhibitor in an amount of about 0.01 to 20 weight percent selected from a compound represented by the following formula:

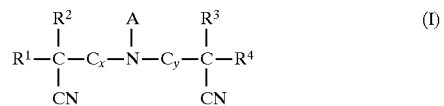

wherein the individual radicals $R^1$, $R^2$, $R^3$ and $R^4$ can be identical or different and are each hydrogen, an aliphatic, cycloaliphatic, araliphatic or aromatic radical, and can be substituted or unsubstituted; A is hydrogen or $C_z$—$CR^5R^6CN$; X, Y and Z are independently selected from 0–5; and $R^5$ and $R^6$ are as defined for $R^1$, $R^2$, $R^3$ and $R^4$ above.

16. The composition of claim 15 wherein said corrosion inhibitor is present in an amount, by weight, of about 0.1 to 10% of said organic resin coating system.

17. The composition of claim 15 wherein said corrosion inhibitor is present in an amount, by weight, of about 0.5 to 1.5% of said organic resin coating system.

18. The composition of claim 16 wherein said corrosion inhibitor is iminodiacetonitrile.

19. The composition of claim 18 wherein said composition is essentially lead free.

20. The composition of claim 16 wherein said corrosion inhibitor is nitrilotriacetonitrile.

21. The composition of claim 20 wherein said composition is essentially lead free.

22. An article having a metallic surface and a protective coating layer over the metallic surface made from a hardened organic resin coating system, selected from the group consisting of alkyd resins, modified alkyd resins, acrylic resins, melamine formaldehyde resins, urea formaldehyde resins, and combinations of the above, incorporating a corrosion inhibitor represented by the formula:

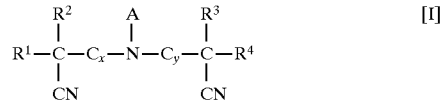

wherein the individual radicals $R^1$, $R^2$, $R^3$ and $R^4$ can be identical or different and are each hydrogen, an aliphatic, cycloaliphatic, araliphatic or aromatic radical, and can be substituted or unsubstituted; A is hydrogen or $C_z$—$CR^5R^6CN$; X, Y and Z are independently selected from 0–5; and $R^5$ and $R^6$ are as defined for $R^1$, $R^2$, $R^3$ and $R^4$ above.

23. The article of claim 22 wherein said metallic surface is made of copper or a copper based alloy.

24. The article of claim 22 wherein said metallic surface is made of silver or a silver based alloy.

25. The article of claim 22 wherein said corrosion inhibitor is present in an amount of about 0.01 to 20 weight percent of said organic resin coating system.

26. The article of claim 22 wherein said corrosion inhibitor is present in an amount of about 0.1 to 10 weight percent of said organic resin coating system.

27. The article of claim 26 wherein said organic resins coating system is selected from the group consisting of alkyd resins and modified alkyd resins.

28. The article of claim 26 wherein said corrosion inhibitor is iminodiacetonitrile.

29. The article of claim 26 wherein said corrosion inhibitor is nitrilotriacetonitrile.

30. A mirror comprising, in sequence, a glass substrate layer, a metallic film layer attached to the glass layer, and a protective coating layer attached to the metal layer made from a hardened organic resin coating system incorporating a corrosion inhibitor represented by the formula:

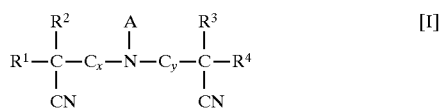 [I]

wherein the individual radicals $R^1$, $R^2$, $R^3$ and $R^4$ can be identical or different and are each hydrogen, an aliphatic, cycloaliphatic, araliphatic or aromatic radical, and can be substituted or unsubstituted; A is hydrogen or $C_z$—$CR^5R^6CN$; X, Y and Z are independently selected from 0–5; and $R^5$ and $R^6$ are as defined for $R^1$, $R^2$, $R^3$ and $R^4$ above.

31. The mirror of claim 30 wherein said corrosion inhibitor is present in an amount of about 0.01 to 20% weight percent of said organic resin coating system.

32. The mirror of claim 30 wherein said metallic film layer comprises one or more layers of a metal selected from the group consisting of silver and copper.

33. The mirror of claim 30 wherein said hardened coating layer is attached to a copper film layer.

34. The mirror of claim 30 wherein said hardened coating layer is attached to a silver film layer.

35. The mirror of claim 30 wherein said hardened coating layer is lead-free.

36. The mirror of claim 30 wherein said corrosion inhibitor is present in an amount of about 0.5 to 5 weight percent of said organic resin coating system.

37. The mirror of claim 30 wherein said organic resin coating system is selected from the group consisting of alkyd resins, modified alkyd resins, acrylic resins, melamine formaldehyde resins, urea formaldehyde resins, and combinations thereof.

38. The mirror of claim 37 wherein said corrosion inhibitor is iminodiacetonitrile.

39. The mirror of claim 37 wherein said corrosion inhibitor is nitrilotriacetonitrile.

40. A process for inhibiting corrosion of metallic film layers on mirrors comprising the steps of:

a. obtaining a mirror having a glass substrate layer and metallic film layer attached to the glass layer;

b. applying a fluid organic resin coating system containing a corrosion inhibitor represented by the formula:

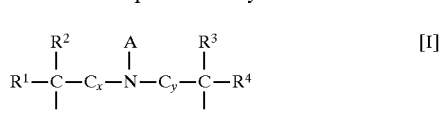 [I]

wherein the individual radicals $R^1$, $R^2$, $R^3$ and $R^4$ can be identical or different and are each hydrogen, an aliphatic, cycloaliphatic, araliphatic or aromatic radical, and can be substituted or unsubstituted; A is hydrogen or $C_z$—$CR^5R^6CN$; X, Y and Z are independently selected from 0–5; and $R^5$ and $R^6$ are as defined for $R^1$, $R^2$, $R^3$ and $R^4$ above; and c. hardening the resin system to produce a protective coating layer over said metallic layer.

41. The process of claim 40 wherein said resin system includes an organic resin selected from the group consisting of alkyd resins, acrylic resins, modified alkyd resins, polyesters, urethane oils, vinyl halide polymers or copolymers, oleoresinous varnishes, nitrocellulose compositions, phenol-formaldehyde resin varnishes, melamine formaldehyde resins, urea formaldehyde resins, epoxy resins, and combinations of the above.

42. The process of claim 40 wherein said corrosion inhibitor is present in an amount of about 0.01 to 20% weight percent of said organic resin coating system.

43. The process of claim 40 wherein said metallic film layer comprises one or more layers of a metal selected from the group consisting of silver and copper.

44. The process of claim 40 wherein said hardened coating layer is attached to a copper film layer.

45. The process of claim 40 wherein said hardened coating layer is attached to a silver film layer.

46. The process of claim 40 wherein said hardened coating layer is lead-free.

47. The process of claim 40 wherein said corrosion inhibitor is present in an amount of about 0.5 to 5 weight percent of said organic resin coating system.

48. A process for inhibiting corrosion of a metallic surface comprising the steps of:

a. obtaining an article having a metallic surface;

b. applying a liquid organic resin system containing a corrosion inhibitor represented by the formula:

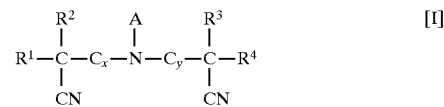 [I]

wherein the individual radicals $R^1$, $R^2$, $R^3$ and $R^4$ can be identical or different and are each hydrogen, an aliphatic, cycloaliphatic, araliphatic or aromatic radical, and can be substituted or unsubstituted; A is hydrogen or $C_z$—$CR^5R^6CN$; X, Y and Z are independently selected from 0–5; and $R^5$ and $R^6$ are as defined for $R^1$, $R^2$, $R^3$ and $R^4$ above; and c. hardening the resin system to produce a protective coating layer over said metallic surface.

49. The process of claim 48 wherein said metallic surface is made of copper or a copper based alloy.

50. The process of claim 48 wherein said metallic surface is made of silver or a silver based alloy.

51. The process of claim 48 wherein said corrosion inhibitor is present in an amount of about 0.01 to 20 weight percent of said organic resin coating system.

* * * * *